United States Patent [19]

Bäbler

[11] Patent Number: 5,641,351

[45] Date of Patent: Jun. 24, 1997

[54] PIGMENT COMPOSITIONS BASED ON 3,6-DI(BIPHENYL)1,4-DIKETO-PYRROLO[3,4C]-PYRROLE

[75] Inventor: Fridolin Bäbler, Hockessin, Del.

[73] Assignee: Ciba-Geigy Corporation, Tarrytown, N.Y.

[21] Appl. No.: 422,299

[22] Filed: Apr. 14, 1995

[51] Int. Cl.$^6$ ............................................. C09B 48/00
[52] U.S. Cl. ............... 106/495; 106/493; 106/494; 106/497; 106/498; 546/49; 546/56; 523/461
[58] Field of Search ............... 106/497, 493, 106/494, 495, 498; 546/49, 56; 523/461

[56] References Cited

U.S. PATENT DOCUMENTS

| | | | |
|---|---|---|---|
| 4,094,699 | 6/1978 | Fitzgerald | 106/497 |
| 4,415,685 | 11/1983 | Iqbal et al. | 524/92 |
| 4,579,949 | 4/1986 | Rochat et al. | 546/167 |
| 4,632,704 | 12/1986 | Babler | 106/497 |
| 4,783,540 | 11/1988 | Bäbler et al. | 548/453 |
| 4,810,304 | 3/1989 | Jaffe et al. | 106/494 |
| 5,095,056 | 3/1992 | Babler et al. | 524/90 |
| 5,194,088 | 3/1993 | Bäbler et al. | 106/412 |
| 5,281,269 | 1/1994 | Ganci et al. | 106/497 |
| 5,286,863 | 2/1994 | Babler et al. | 106/497 |
| 5,387,281 | 2/1995 | Babler et al. | 106/495 |

*Primary Examiner*—Mark L. Bell
*Assistant Examiner*—Scott L. Hertzog
*Attorney, Agent, or Firm*—George R. Dohmann

[57] ABSTRACT

Heat-stable, red pigment compositions comprising a physical mixture of 1,4-diketo-3,6-di(4-biphenylyl)-pyrrolo [3,4 c]-pyrrole and a 2,9-dichloroquinacridone pigments, processes for preparing the pigment compositions and the use of the compositions for pigmenting high-molecular-weight organic materials are disclosed.

18 Claims, No Drawings

PIGMENT COMPOSITIONS BASED ON 3,6-DI(BIPHENYL)1,4-DIKETO-PYRROLO[3,4C]-PYRROLE

SUMMARY

The present invention relates to heat-stable, red pigment compositions comprising a physical mixture of 1,4-diketo-3,6-di(4-biphenylyl)-pyrrolo [3,4 c]-pyrrole and a 2,9-dichloroquinacridone pigments. The present invention also relates to processes for the preparation of the red pigment compositions. The red pigment compositions are useful for pigmenting coatings and plastics, particularly engineering plastics.

BACKGROUND 1,4-diketo-3,6-di(4-biphenylyl)-pyrrolo [3,4 c]-pyrrole pigment is known for its high chroma and outstanding weatherfastness properties. Its use in automotive paint applications is well-known. However, the use of 1,4-diketo-3,6-di(4-biphenylyl)-pyrrolo [3,4 c]-pyrrole as a pigment in high performance plastics, for example polar engineering plastics, is restricted because it does not possess sufficient heat stability for use in such substrates.

The use of 2,9-dichloroquinacridone having a surface area below 30 $m^2/g$ as a pigment for engineering plastics is known. The use of pigment compositions containing 2,9-dichloroquinacridone compositions and bis-(4,5,6,7-tetrachloro-isoindolin-1-on-3-ylidene)-phenylene-1,4-diamine for pigmenting engineering plastics is also known. Although these pigments show outstanding heat stability, they are not suitable for all applications because they have weak color strength and cover only a magenta to bluish-red color space.

U.S. Pat. No. 4,810,304 discloses solid solution pigments containing quinacridone and diketopyrrolopyrrole components. When compared to the corresponding physical pigment mixtures, such pigment solid solutions show unique and generally improved pigment properties.

This invention relates to the surprising discovery that physical mixtures containing proportions of 1,4-diketo-3,6-di(4-biphenylyl)-pyrrolo [3,4 c]-pyrrole and 2,9-dichloroquinacridone within certain ranges show advanced pigment properties without pigment solid solution formation. The new pigment compositions possess excellent dispersibility, high color strength, high weatherability, high saturation and outstanding heat stability in engineering plastics.

DETAILED DESCRIPTION

The present invention relates to a red colored pigment composition comprising a physical mixture of component (A) and of component (B), wherein component (A) is a 1,4-diketo-3,6-di(4-biphenylyl)-pyrrolo [3,4 c]-pyrrole pigment having a specific surface area below 60 $m^2/g$; and component (B) is a 2,9-dichloroquinacridone pigment having a specific surface area below 60 $m^2/g$, and wherein component (A) is present in an amount of from 30 to 90 percent by weight and component (B) is present in an amount of from 10 to 70 percent by weight, the percentages by weight being based on the combined weights of components (A) and (B).

The inventive pigment compositions comprise a physical mixture of component (A) and component (B). Physical mixtures are identifiable by their x-ray diffraction pattern, which is generally a composite of the x-ray diffraction patterns of the individual components. In contrast, solid solutions show an x-ray diffraction pattern which is not a composite of the x-ray diffraction patterns of the individual components. Generally the x-ray diffraction pattern of a solid solution either contains new peaks which do not correspond to peaks found in the x-ray diffraction pattern of the components, or else it closely matches the x-ray diffraction of only one of the components.

The specific surface area of both components (A) and (B) must be below 60 $m^2/g$. The specific surface area of component (A) is preferably below 50 $m^2/g$, and most preferably is from about 15 to about 45 $m^2/g$. The specific surface area of component (B) is preferably below 45 $m^2/g$, and is most preferably from 4 to 35 $m^2/g$. In general the specific surface area is obtained by any method, preferably by the BET method.

Preferably, the compositions contain from about 35 to 80 percent by weight of component (A) and about 20 to 65 percent by weight of component (B). Most preferably, the compositions contain from about 40 to 70 percent by weight of component (A) and from 30 to 60 percent by weight of component (B).

Component (A) is a 1,4-diketo-3,6-di(4-biphenylyl)-pyrrolo [3,4 c]-pyrrole of formula I which has a specific surface area below 60 $m^2/g$.

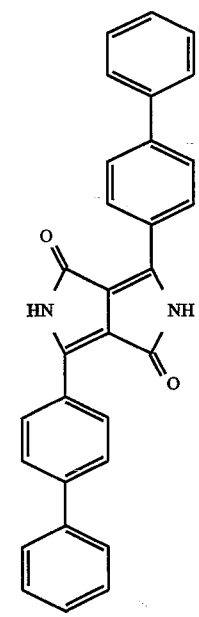

This compound is also known as 3,6-di(4-biphenyl)-2,5-dihydro-pyrrolo [3,4-c]pyrrole-1,4-dione or 3,6-di(4-biphenyl)-1,4-diketopyrrolo [3,4-c]pyrrole.

Component (B) is a 2,9-dichloroquinacridone of formula II which has a specific surface area of below 60 $m^2/g$.

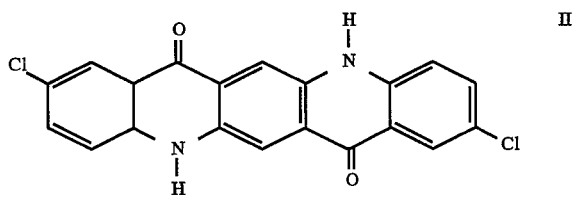

Component (A), 1,4-diketo-3,6-di(4-biphenylyl)-pyrrolo [3,4 c]-pyrrole is known as a pigment and can be prepared by known methods, for example as described in U.S. Pat. No. 4,579,949.

Component (B), 2,9-dichloroquinacridone is also known as a pigment and can be prepared by known methods, for example by oxidizing 2,9-dichloro-6,13-dihydroquinacridone.

The desired surface area characteristics of component (A) and component (B) are obtained by methods known in the art, for example by modification of the preparatory process or by suitable aftertreatments of the pigment crude. Suitable aftertreatments of the pigment crude include recrystallization of the corresponding pigment crudes from an organic solvent, preferably a polar solvent, for example dimethylsulfoxide (DMSO), N-methylpyrrolidone or dimethylformamide.

In addition to the physical mixture of components (A) and (B), the present compositions optionally contain additional components customarily used in pigment compositions, for example, texture improving agents.

Texture improving agents are especially useful as an additional component which can improve the properties of the inventive compositions. Suitable texture improving agents include fatty acids having at least 12 carbon atoms, and amides, esters or salts of said fatty acids, such as stearic acid, behenic acid, naphthenic acid, laurylamine, stearylamine. In addition, aliphatic 1,2-diols, epoxidized soya bean oil, waxes, resin acids and resin acid salts are suitable texture improving agents. Rosin acids and rosin acid salts are especially suitable texture improving agents.

The texture improving agent can be incorporated into the composition before, during or after combining components (A) and (B). The texture improving agent is preferably incorporated into the composition in an amount of from 0.05 to 20 percent, most preferably 1 to 10 percent, by weight, based on the combined weights of components (A) and (B). For example, a pigment composition which contains 15 percent of the texture improving agent could be a physical mixture comprising 50 parts of component (A), 50 parts of component (B) and 15 parts of the texture improving agent.

The compositions of the present invention are prepared by conventional methods, for example, by blending the individual components as dry powders or, preferably, by mixing the corresponding wet presscakes.

A preferred method of preparing a pigment composition comprises the steps of (a) blending an aqueous suspension comprising component (A), component (B), and a water-soluble rosin acid salt; (b) precipitating an insoluble salt of the rosin acid by adding divalent or trivalent metal cation to the suspension; and (c) isolating the composition by filtering the suspension.

Alternatively, the inventive pigment compositions are prepared from the corresponding pigment crudes by premilling a mixture of 1,4-diketo-3,6-di(4-biphenylyl)-pyrrolo [3,4-c]pyrrole and 2,9-dichloroquinacridone to form a premilled pigment followed by heating the premilled pigment in a polar solvent, for example dimethylsulfoxide, N-methylpyrrolidone or dimethylsulfoxide and then isolating the pigment composition. Preferably the aftertreatment in the polar solvent corresponds to the process described in U.S. Pat. No. 5,194,088, which is here incorporated by reference. The aftertreatment is performed in conventional equipment by stirring a suspension of the pigment mixture in the polar solvent, or, using less solvent, by kneading a pasty formulation of the pigment mixture in the organic solvent with a kneader. The aftertreatment in polar solvent is preferably carried out at a temperature below 150° C., most preferably below 100° C., for a period of 1 to 10 hours, depending on the recrystallization temperature.

As another alternative, the premilled pigment is recrystallized in aqueous base in the presence of a surfactant and alcohol according to procedures described in U.S. Pat. Nos. 4,094,699 and 5,281,269.

In a preferred method, the pigment compositions are prepared by precipitating a mixture of the corresponding pigment crudes from a solution in basic DMSO. Thus, the pigment compositions according to this invention are obtained by a process, which comprises the steps of (a) preparing a pigment salt solution by dissolving 1,4-diketo-3,6-di(4-biphenylyl)-pyrrolo [3,4 c]-pyrrole and 2,9-dichloroquinacridone in dimethylsulfoxide which contains an effective salt forming amount of a base and sufficient water to solubilize the base, (b) precipitating the diaryldiketopyrrolo-[3,4-c]-pyrrole/2,9-dichloroquinacridone pigment physical mixture from the pigment salt solution to form a pigment suspension, (c) recrystallizing the pigments by stirring the precipitated pigment suspension at temperatures above 50° C., preferably at reflux for ½ hour to 6 hours, and (d) isolating the pigment composition.

In a variation of this procedure, the pigment salt solution is prepared by oxidizing 2,9-dichloro-6,13-dihydroquinacridone to 2,9-dichloroquinacridone in basic DMSO according to the methods described in U.S. Pat. No. 5,286,863, which is here incorporated by reference, to yield a pigment salt solution of 2,9-dichloroquinacridone. After the oxidation is substantially complete, 1,4-diketo-3,6-di(4-biphenylyl)-pyrrolo [3,4 c]-pyrrole is also dissolved in the basic DMSO to form a pigment salt solution containing both components of the inventive pigment compositions. After the pigment salt solution is formed, steps (b)–(d) are carried out as described above. Such a method avoids the extra step involved in the isolation of 2,9-dichloroquinacridone crude.

Thus the present invention includes a process for the preparation of a pigment composition which comprises (a) oxidizing a precursor of 2,9-dichloroquinacridone to 2,9-dichloroquinacridone in a solution consisting essentially of the precursor, dimethyl sulfoxide, an alkali metal hydroxide, water and a catalytically effective amount of a quinone catalyst, the precursor being a 2,9-dichloro-6,13-dihydroquinacridone, said dimethyl sulfoxide being present in an amount ranging from 3 to 20 times the weight of the precursor, said water being present in a concentration of 0.2 to 3.0 parts per part, by weight, of the precursor, and the molar ratio of said alkali metal hydroxide to said precursor being 4:1 to 7:1, by introducing a gas containing at least 2 percent by weight of molecular oxygen above or below the surface of the solution at a temperature from 50° C. to 90° C., (b) subsequently dissolving 1,4-diketo-3,6-di(4-biphenylyl)-pyrrolo [3,4 c]-pyrrole in the solution resulting from step (a) to form a pigment salt solution, (c) precipitating the pigments from the pigment salt solution to form a pigment suspension, (d) recrystallizing the pigments in the pigment suspension and (e) isolating the pigment composition.

The inventive pigment compositions possess high saturation, excellent dispersibility, high color strength, excellent migration resistance and outstanding heat stability for a diketopyrrolopyrrole pigment.

The present compositions are highly suitable for coloring high-molecular-weight materials, which can be processed to casted and molded articles. Thus, the present invention also relates to a pigmented composition which comprises a high-molecular-weight organic material and an effective pigmenting amount of a pigment composition of the present invention, and to a process for preparing said pigmented compositions.

The pigment compositions are normally utilized to pigment high-molecular-weight organic materials, in particular engineering plastics. Suitable high-molecular-weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones, polyamides; polycycloamides; polyimides, polyethers, polyetherketones such as polyphenylene oxides, and also poly-p-xylene, polyvinyl halides such as polyvinyl chloride, polyvinylidene chloride, polyvinylidene fluoride or polytetrafluoroethylene, acrylic polymers such as polyacrylates, polymethacrylates or polyacrylonitrile, rubber, silicone polymers, phenol/formaldehyde resins, melamine/formaldehyde resins, urea/formaldehyde resins, epoxy resins, styrene butadiene rubber, acrylonitrilebutadiene rubber or chloroprene rubber, singly or in mixtures.

Generally, an effective pigmenting amount of the compositions are incorporated into the high-molecular-weight organic material. In particular, from 0.01 to 30% by weight, preferably 0.1 to 10% by weight, based on the weight of the high-molecular-weight organic material to be pigmented, of the pigment composition is incorporated into the highmolecular-weight organic material.

Many organic pigments demonstrate insufficient heat stability to be used in engineering plastics. This poor heat stability is believed to be due to partial solubility of the pigment at high temperatures, particularly for the temperature range of 400°–600° F. (205°–315° C.). The present pigment compositions show a minimal change in color or dulling when processed at elevated temperatures.

Pure, high chroma, useful new color shades can be obtained when the present pigment compositions are mixed with other organic and/or inorganic pigments and/or polymer soluble dyes. Furthermore, the present pigment compositions are highly dispersible and can be readily incorporated into organic matrixes to provide homogenous colorations possessing high opacity, saturation and high tinting strength with excellent light and weather fastness properties.

The high-molecular-weight organic materials are pigmented with the pigment compositions of present invention by mixing the composition, if desired in the form of masterbatch, into substrates using high shear techniques including roll mills or a mixing or grinding apparatus. The pigmented material is then brought into the desired final form by known methods, such as calendering, pressing, extruding, brushing, casting or injection molding. The pigmented molded articles utilizing the present compositions are, in particular, those obtained by orienting stress, for example, molding and casting, ribbons, fibers or rolled sheets.

Non rigid moldings are produced, or polymer brittleness is reduced by incorporating plasticizers into the highmolecular-weight compounds before the shaping operation. Suitable plasticizers include, for example, esters of phosphoric acid, phthalic acid or sebaic acid. Plasticizers can be incorporated into the polymers either before or after the incorporation of the pigment composition of this invention.

Due to their outstanding heat stability and excellent weatherability, the pigment compositions of this invention are also useful for coating compositions such as solvent-or-waterbased automotive coatings and industrial paints.

The following examples are intended to further describe, but not to further limit, the scope of the present invention. In these examples all parts given are by weight unless otherwise indicated.

EXAMPLE 1

A 500 ml flask equipped with a thermometer, stirrer, and condenser is charged with 29.3 grams of 45% aqueous potassium hydroxide, 28 ml of water, and 250 ml of dimethylsulfoxide (DMSO). 23.0 grams 1,4-diketo-3,6-di(4-biphenylyl)-pyrrolo [3,4 c]-pyrrole and 23.0 grams 2,9-dichloroquinacridone pigment crude are added with stirring at 50°–60° C. The mixture is heated to 75°–80° C. and stirred at 75°–80° C. for 10 minutes, whereby the pigments dissolve as their dipotassium salts. The resulting solution is drowned into 850 ml methanol at 18° to 40° C. to yield a pigment suspension. The pigment suspension is heated to reflux and stirred at reflux for 4 hours. The resulting red pigment is isolated by filtration and washed DMSO-free with methanol followed by water to a pH 7.0–8.0 and then dried. The x-ray diffraction pattern indicates that both components are present as a physical mixture in the resulting pigment. The specific surface area is 41.6 $m^2/g$ as determined by the BET method. The red pigment composition so obtained is suitable for coloring engineering plastics and gives colorations of high color strength with excellent heat stability.

EXAMPLE 2

The procedure of Example 1 is repeated except that 27.0 grams 1,4-diketo-3,6-di(4-biphenylyl)-pyrrolo [3,4 c]-pyrrole and 18.0 grams of 2,9-dichloroquinacridone are used instead of 23.0 grams of the respective components. The procedure yields a red pigment composition having a specific surface area of 38 $m^2/g$. The pigment composition shows a strong color and has excellent heat and light stability when incorporated into engineering plastics.

EXAMPLE 3A

An attritor mill is charged with 250 grams 1,4-diketo-3,6-di(4-biphenylyl)-pyrrolo [3,4 c]-pyrrole crude and 250 grams 2,9-dichloroquinacridone crude. The mill is fitted with L-arms and charged with 3.78 liters of 0.6 cm diameter stainless steel balls grinding media. The mill is then rotated at 500 RPM under nitrogen for 80 minutes. At the conclusion of the milling cycle, the premilled powder is recovered, yielding 480 grams highly aggregated dark red premill powder.

EXAMPLE 3B

A 1 liter flask equipped with a stirrer, thermometer and condenser is charged with 500 ml DMSO and 50 grams of the above described premill powder (Example 3A). The suspension is heated to 90° C. and stirred for 7 hours at 90°–95° C. The hot pigment suspension is filtered and the presscake washed with methanol followed by water until DMSO free and then dried at 80°–100° C. in an oven, yielding 48 grams red pigment composition. The pigment composition has a specific surface area of 39 $m^2/g$ determined by the BET method. The X-ray diffraction pattern shows the peaks of both pigment components, indicating that both components are present as a physical mixture in the resulting pigment. The red pigment composition shows a strong color and excellent heat and light stability when incorporated in engineering plastics.

EXAMPLE 3C

The procedure of Example 3B is repeated using N-dimethylformamide (DMF) as a solvent to yield a red pigment composition of good heat stability and fastness properties.

EXAMPLE 3D

The procedure of Example 3B is repeated using N-methylpyrrolidone (NMP) as solvent to yield a red pigment composition of similar good pigment properties.

EXAMPLE 4

A 1 liter flask equipped with a thermometer, stirrer, condenser and gas inlet tube is charged with 50 grams 2,9-dichloro-6,13-dihydroquinacridone, 0.8 anthraquinone-2-sulfonic acid, sodium salt monohydrate and 630 ml dimethylsulfoxide. The suspension is stirred and a mixture of 63.7 grams of 45% aqueous potassium hydroxide and 60 ml water is added. The resulting solution is heated to 80°–83° C. During the heating period the mixture is flushed with nitrogen to an oxygen content of 0% in the off-gas stream indicated by an oxygen analyzer. Air is then introduced under the surface of the stirred reaction mixture at a rate of 200 ml/minute until the oxygen analyzer indicates 6–7% oxygen in the off-gas stream. After the formation of 2,9-dichloroquinacridone is essentially complete, nitrogen is introduced instead of air to avoid the formation of the undesirable 2,9-dichloroquinacridonequinone by over oxidation and fifty grams 1,4-diketo-3,6-di(4-biphenylyl)-pyrrolo [3,4 c]-pyrrole are added to the reaction mixture and dissolved by stirring for 10 minutes under nitrogen flow at 80°–83° C. The resulting solution is drowned into 2 liters methanol at 18° to 40° C. The pigment suspension is heated to reflux and stirred for 4 hours at reflux. The red pigment is isolated by filtration and is washed DMSO free with methanol followed by water to a pH 7.0–8.0 and dried. The pigment shows the overlapped X-ray diffraction pattern of both components indicating the composition is a physical mixture of the components. The specific surface area is 42 $m^2/g$ determined by the BET method. The red pigment composition so obtained shows excellent pigment properties like dispersibility, color strength, heat and light stability when applied in plastics or coatings.

EXAMPLE 5

A pint jar is charged with 15 grams 2,9-dichloroquinacridone pigment having a specific surface area of 27 $m^2/g$ and 15 grams 1,4-diketo-3,6-di(4-biphenylyl)-pyrrolo [3,4 c]-pyrrole having a specific surface area of 29.8 $m^2/g$. The jar is rolled on a roller gear for 2 hours yielding a red pigment composition having a specific surface area of 28.7 $m^2/g$. The red pigment composition shows a strong color and outstanding heat and light stability when incorporated in engineering plastics.

EXAMPLE 6

58.3 grams of an aqueous presscake containing 20 grams 1,4-diketo-3,6-di(4-biphenylyl)-pyrrolo [3,4 c]-pyrrole having a specific surface area of 29 $m^2/g$, 62 grams of an aqueous presscake containing 20 grams 2,9-dichloroquinacridone having a specific surface area of 19 $m^2/g$ and 1.2 grams of the sodium salt of rosin dissolved in 40 ml hot water (DRESINATE X, from HERCULES Corp.) are blended together with around 300 ml water to form a suspension. 0.4 grams calcium chloride dissolved in 30 ml water are added to the stirred pigment suspension, precipitating the calcium salt of the rosin. The resulting homogeneous pigment suspension is filtered at a pH of 5.0–5.5. The resulting pigment presscake is washed with water, dried and pulverized. The procedure yields 40 grams of a red pigment composition having a specific surface area of 23.5 $m^2/g$. The pigment composition is highly saturated, and due to its excellent heat stability and weatherfastness properties is highly suitable for coloring automotive paints and engineering plastics.

EXAMPLE 7

The procedure of Example 5 is repeated using 12 grams 1,4-diketo-3,6-di(4-biphenylyl)-pyrrolo [3,4 c]-pyrrole and 18 grams 2,9-dichloroquinacridone yielding a red pigment composition with similar good pigment properties.

EXAMPLE 8

63.0 grams of polyvinylchloride, 3.0 grams epoxidized soya bean oil, 2.0 grams of barium/cadmium heat stabilizer, 32.0 grams dioctyl phthalate and 1.0 gram of the pigment composition prepared according to Example 1 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in a tinctorially attractive red shade with excellent fastness to heat, light and migration.

EXAMPLE 9

5 grams of the pigment compositions prepared according to Example 1, 2.5 grams hindered amine light stabilizer, 1.0 gram benzotriazole UV absorber, 1.0 gram hindered phenol antioxidant and 1.0 gram phosphite process stabilizer are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at temperatures of 205° C., 260° C. and 315° C. Homogeneously colored chips which show a similar red color is obtained at each of the temperature steps, demonstrating the excellent heat stability of the pigment composition. Similar results are obtained if the pigment composition of Example 1 is replaced by the pigment compositions of Examples 2, 3B, 3C, 3D, 4, 5, 6 or 7.

EXAMPLE 10

The procedure of Example 8 is repeated using 0.2 grams of pigment composition prepared according to Example 1 and 1.8 g. $TiO_2$ pigment as coloring component to yield a PVC sheet with a very strong reddish tinting color shade.

EXAMPLE 11

A rigid PVC mixture is prepared in a fluid mixer by stirring the following components for about 5 minutes at a speed of 1400 rpm.

92.0 grams—vinyl resin
8.0 grams—vinyl copolymer
1.5 grams—epoxidized soya bean oil plasticizer
2.8 grams—barium/cadmium stabilizer 0.7 grams—organic phosphite auxiliary stabilizer
0.4 grams—fatty acid ester
0.2 grams—paraffin oil derivative lubricant 360,
0.25 grams—benzotriazole derivative light stabilizer A mixture of 1.5 parts by weight of the rigid PVC mixture and 0.05 parts by weight of a pigment composition, which is prepared according to Example 1, is mixed at room temperature for about 3 minutes at a speed of about 2000 rpm. The pigmented rigid PVC so obtained is pressed on a roll mill for 6 minutes at 190° C., 25 rpm and a friction of 1:1.2, and then pressed at 190° C. for 6 minutes on a press between chromium-plated steel plates to a thickness of about 1 mm. The pressed sheet so obtained is of red color exhibiting excellent fastness to light and weathering. Similar results are obtained if the pigment composition of Example 1 is replaced by the pigment compositions of Examples 2, 3B, 3C, 3D, 4, 5, 6 or 7.

EXAMPLE 12

The procedure of Example 9 is repeated using polypropylene instead of high density polyethylene as a substrate to yield red colored chips which show excellent heat and lightfastness properties.

EXAMPLE 13

Six grams of a pigment composition prepared according Example 2, 9 grams hindered amine light stabilizer, 3 grams benzotriazole UV absorber, and 3 grams hindered phenol antioxidant are mixed together with 1200 grams ABS resin at a speed of 175–200 rpm for 30 seconds after flux. The fluxed pigmented resin is chopped up while warm and malleable, and then fed through a granulator. The resulting granules are molded on a injection molder with a 7 minute dwell time and a 42-second cycle time at temperatures of 232° C. (450° F.) and 288° C. (550° F.) respectively. Homogeneously colored chips which show similar red color shades at each of the temperature steps are obtained.

EXAMPLE 14

A mixture of 100 g polyethylene terephthalate granules and 0.5 g of a composition prepared according to Example 1 is blended for 15 minutes in a glass bottle on a roller gear bed. Extrusion of the mixture into a ribbon in a laboratory extruder produces a ribbon colored in a uniform red color possessing excellent light and heat fastness. Similar results are obtained if the pigment composition of Example 1 is replaced by the pigment compositions of Examples 2, 3B, 3C, 3D, 4, 5, 6 or 7.

EXAMPLE 15

The procedure described in Example 14 is repeated using polyurethane in place of the polyethylene-terephthalate to yield a red polyurethane ribbon having excellent lightfastness.

EXAMPLE 16

The procedure of Example 14 is repeated using polyphenylene ether/polyamide blend in place of the polyethylene-terephthalate to yield a ribbon having a uniform red color with excellent fastness properties.

EXAMPLE 17

The procedure of Example 14 is repeated using polymethylmethacrylate granules in place of the polyethylene-terephthalate to yield a ribbon having red shade with excellent fastness properties.

EXAMPLE 18

The procedure of Example 9 is repeated using polyamide granules to yield red colored chips showing excellent heat and lightfastness properties.

EXAMPLE 19

The procedure of Example 14 is repeated using polycarbonate in place of polyethylene-terephthalate to yield ribbons having a uniform, strong red color with excellent fastness properties.

EXAMPLE 20

A mixture of 130 grams of steatite balls 8 mm in diameter and 47.5 grams of an alkyd melamine baking finish, which baking finish is a mixture containing 60 grams of alkyd resin 50% in xylene:butanol (2:1 mixture), 2 grams of xylene, 2 grams of ethylene glycol monomethyl ether and 2.5 grams of the pigment composition obtained in Example 1, is dispersed in a 200 ml capacity glass flash with a twist-off cap on a roll stand in the course of 72 hours. After the steatite balls have been separated, 2.4 grams of the full tone mixture thus dispersed is mixed with 9.6 grams of titanium dioxide and a further 24.0 grams of the above described alkyd melamine baking finish. The mixture thus obtained is sprayed onto aluminum panels and subsequently baked at 130° C. for 30 minutes. The resulting red finish shows high tinting strength and excellent fastness properties. Similar results are obtained if the pigment composition of Example 1 is replaced by the pigment compositions of Examples 2, 3B, 3C, 3D, 4, 5, 6 or 7.

EXAMPLE 21

A mixture of 130 grams of steatite balls (diameter: 8 mm) and 45.5 grams of a thermosetting acrylic finish, which finish is a mixture of the following composition:

41.3 grams of acrylic resin
16.3 grams of melamine resin
32.8 grams of xylene,
4.6 grams of ethylglycol acetate,
2.0 grams of butyl acetate,
1.0 grams of Siliconoil A, 1% in xylene (BAYER AG), and
2.5 grams of the pigment composition obtained in Example 1; are dispersed in a 200 ml glass flask with a twist off seal on a roll stand over the course of 72 hours. The steatite balls are separated and 8.0 grams of the millbase, 0.6 grams of aluminum paste, 1.0 grams of methyl ethyl ketone and 18.4 grams of the above mentioned thermosetting acrylic finish are thoroughly mixed and the resulting mixture is sprayed onto aluminum panels and subsequently baked at 130° C. for 30 minutes. Very strong red metallized coatings having excellent fastness properties are obtained. Similar results are obtained if the pigment composition of Example 1 is replaced by the pigment compositions of Examples 2, 3B, 3C, 3D, 4, 5, 6 or 7.

In addition to the embodiments described above, numerous variations of these embodiments can be made in accordance with this invention.

I claim:

1. A red colored pigment composition comprising a physical mixture of component (A) and of component (B), wherein component (A) is a 1,4-diketo-3,6-di(4-biphenylyl) -pyrrolo [3,4 c]-pyrrole pigment having a specific surface area below 60 m$^2$/g; and component (B) is a 2,9- dichloroquinacridone pigment having a specific surface area below 60 m²/g, and wherein component (A) is present in an amount of from 30 to 90 percent by weight and component (B) is present in an amount of from 10 to 70 percent by weight, the percentages by weight being based on the combined weights of components (A) and (B).

2. A composition of claim 1 wherein the specific surface area of component (A) is less than 50 m²/g.

3. A composition of claim 2, wherein the specific surface area of component (A) is from 15 to 45 m²/g.

4. A composition of claim 1, wherein the specific surface area of component (B) is less than 45 m²/g.

5. A composition of claim 4, wherein the specific surface area of component (B) is from 4 to 35 m²/g.

6. A composition of claim 1 wherein the specific surface area of component (A) is from 15 to 45 m²/g and the specific surface area of component (B) is from 4 to 35 m²/g.

7. A composition of claim 1, wherein the composition comprises from 35 to 80 percent by weight of component (A) and from 20 to 65 percent by weight of component (B), the percentage by weight being based on the combined weights of components (A) and (B).

8. A composition of claim 7, wherein the composition comprises from 40 to 70 percent by weight of component (A) and from 30 to 60 percent by weight of component (B).

9. A composition of claim 1, which further comprises from 0.05 to 20 percent by weight, based on the combined weights of components (A) and (B), of a texture improving agent selected from the group consisting of fatty acids having at least 12 carbon atoms, amides, esters or salts of said fatty acids, aliphatic 1,2-diols, epoxidized soya bean oil, waxes, resin acids and resin acid salts.

10. A composition of claim 1, which further comprises from 0.05 to 20 percent by weight, based on the combined weights of components (A) and (B), of a texture improving agent selected from the group consisting a rosin acid or a rosin acid salt.

11. A composition of claim 9 wherein the texture improving agent is present in an amount of from 1 to 10 percent by weight, based on the combined weights of components (A) and (B).

12. A process for the preparation of a red-colored pigment composition which is a physical mixture comprising from 30 to 90 percent by weight component (A), from 10 to 70 percent by weight of component (B), wherein component (A) is a 1,4-diketo-3,6-di(4-biphenylyl)-pyrrolo [3,4 c]-pyrrole pigment having a specific surface area below 60 m²/g; and component (B) is a 2,9-dichloroquinacridone pigment having a specific surface area below 60 m²/g; and from 0.05 to 20 percent by weight of a texture improving agent selected from the group consisting of rosin acid and a rosin acid salt, the percentages by weight being based on the combined weights of components (A) and (B), which process comprises (a) blending an aqueous suspension comprising component (A), component (B), and a water-soluble rosin acid salt;

(b) precipitating an insoluble salt of the rosin acid by adding divalent or trivalent metal cation to the suspension; and (c) isolating the composition by filtering the suspension.

13. A process for the preparation of a red-colored pigment composition which is a physical mixture comprising from 30 to 90 percent by weight component (A) and from 10 to 70 percent by weight of component (B), wherein component (A) is a 1,4-diketo-3,6-di(4-biphenylyl)-pyrrolo [3,4 c]-pyrrole pigment having a specific surface area below 60 m²/g; and component (B) is a 2,9-dichloroquinacridone pigment having a specific surface area below 60 m²/g, the percentages by weight being based on the combined weights of components (A) and (B), which process comprises mixing components (A) and (B) as dry powders or as the corresponding wet presscakes.

14. A process for the preparation of a red-colored pigment composition which is a physical mixture comprising from 30 to 90 percent by weight component (A) and from 10 to 70 percent by weight of component (B), wherein component (A) is a 1,4-diketo-3,6-di(4-biphenylyl)-pyrrolo [3,4 c]-pyrrole pigment having a specific surface area below 60 m²/g: and component (B) is a 2,9-dichloroquinacridone pigment having a specific surface area below 60 m²/g, the percentages by weight being based on the combined weights of components (A) and (B), which process comprises (a) premilling a mixture of 1,4-diketo-3,6-di(4-biphenylyl)-pyrrole [3,4 c]-pyrrole and 2,9-dichloroquinacridone to form a premilled pigment;

(b) subsequently heating a suspension of the premilled pigment in a polar solvent at an elevated temperature, and (c) isolating the pigment composition.

15. A process for the preparation of a red-colored pigment composition which is a physical mixture comprising from 30 to 90 percent by weight component (A) and from 10 to 70 percent by weight of component (B), wherein component (A) is a 1,4-diketo-3,6-di(4-biphenylyl)-pyrrolo [3,4 c]-pyrrole pigment having a specific surface area below 60 m²/g; and component (B) is a 2,9-dichloroquinacridone pigment having a specific surface area below 60 m²/g, the percentages by weight being based on the combined weights of components (A) and (B), which process comprises (a) preparing a pigment salt solution by dissolving 1,4-diketo-3,6-di(4-biphenylyl)-pyrrolo [3,4 c]-pyrrole and 2,9-dichloroquinacridone in dimethyl sulfoxide which contains an effective amount of a base and sufficient water to solubilize the base;

(b) precipitating the pigments from the pigment salt solution to form a pigment suspension;

(c) recrystallizing the pigments by stirring the pigment suspension at a temperature above 50° C. for a period of ½ hour to 6 hours, and (d) isolating the pigment composition.

16. A process for preparing a pigmented plastic material, which comprises incorporating of an effective pigmenting amount of a red-colored pigment composition which is a physical mixture comprising from 30 to 90 percent by weight component (A) and from 10 to 70 percent by weight of component (B), wherein component (A) is a 1,4-diketo-3,6-di(4-biphenylyl)-pyrrolo [3,4 c]-pyrrole pigment having a specific surface area below 60 m²/g; and component (B) is a 2,9-dichloroquinacridone pigment having a specific surface area below 60 m²/g, the percentages by weight being based on the combined weights of components (A) and (B), into said plastic material.

17. A process of claim 16, wherein the composition is present in said plastic material in a concentration of from 0.01 to about 30 percent by weight, based on the weight of said pigmented plastic material.

18. A process of claim 17, wherein said plastic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers and copolymers thereof.

* * * * *